United States Patent
Farkas et al.

(10) Patent No.: US 7,965,621 B2
(45) Date of Patent: Jun. 21, 2011

(54) METHOD AND ARRANGEMENT FOR FAILURE HANDLING IN A NETWORK

(75) Inventors: János Farkas, Kecskemét (HU); Csaba Antal, Kiskunlacháza (HU); Lars Westberg, Enköping (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 188 days.

(21) Appl. No.: 11/916,565

(22) PCT Filed: Jun. 14, 2005

(86) PCT No.: PCT/SE2005/000895
§ 371 (c)(1),
(2), (4) Date: Jul. 9, 2008

(87) PCT Pub. No.: WO2006/135282
PCT Pub. Date: Dec. 21, 2006

(65) Prior Publication Data
US 2008/0291822 A1 Nov. 27, 2008

(51) Int. Cl.
*G01R 31/08* (2006.01)
(52) U.S. Cl. .................. 370/216; 370/395; 370/242
(58) Field of Classification Search .......... 370/200–253, 370/503, 395.1–395.7, 404–411; 709/203; 455/3.02
See application file for complete search history.

(56) References Cited

U.S. PATENT DOCUMENTS

| | | | |
|---|---|---|---|
| 6,473,403 B1* | 10/2002 | Bare | 370/236 |
| 6,538,988 B1* | 3/2003 | Natarajan et al. | 370/216 |
| 7,233,991 B2* | 6/2007 | Adhikari | 709/224 |
| 7,656,300 B2* | 2/2010 | Ronnau | 340/573.2 |
| 2003/0095554 A1 | 5/2003 | Shimizu | |
| 2003/0188019 A1* | 10/2003 | Wesley | 709/245 |
| 2004/0047300 A1* | 3/2004 | Enomoto et al. | 370/256 |
| 2005/0050398 A1 | 3/2005 | Rao et al. | |
| 2007/0127367 A1* | 6/2007 | Ogasahara et al. | 370/226 |
| 2009/0097627 A9* | 4/2009 | Liljestrand et al. | 379/201.03 |

FOREIGN PATENT DOCUMENTS

CN 1525715 A 9/2004
WO WO2005020022 * 3/2005

* cited by examiner

*Primary Examiner* — Ricky Ngo
*Assistant Examiner* — Iqbal Zaidi

(57) ABSTRACT

A method and arrangement for failure handling in a tree-structured communications network having interconnected edge nodes and switching nodes. VLANs may be established by using spanning trees to provide connectivity in case of a failure in the network. Emitters in the edge nodes periodically broadcast alive messages on the VLANs, and notifiers note the alive messages. A missing alive message indicates a failure on one of the VLANs, and the notifier broadcasts corresponding failure messages on the VLANs. When the alive messages are restored, the notifier broadcasts corresponding repair messages. If a notifier fails to note a failure, one of the edge nodes performs a similar function although somewhat slower.

2 Claims, 11 Drawing Sheets

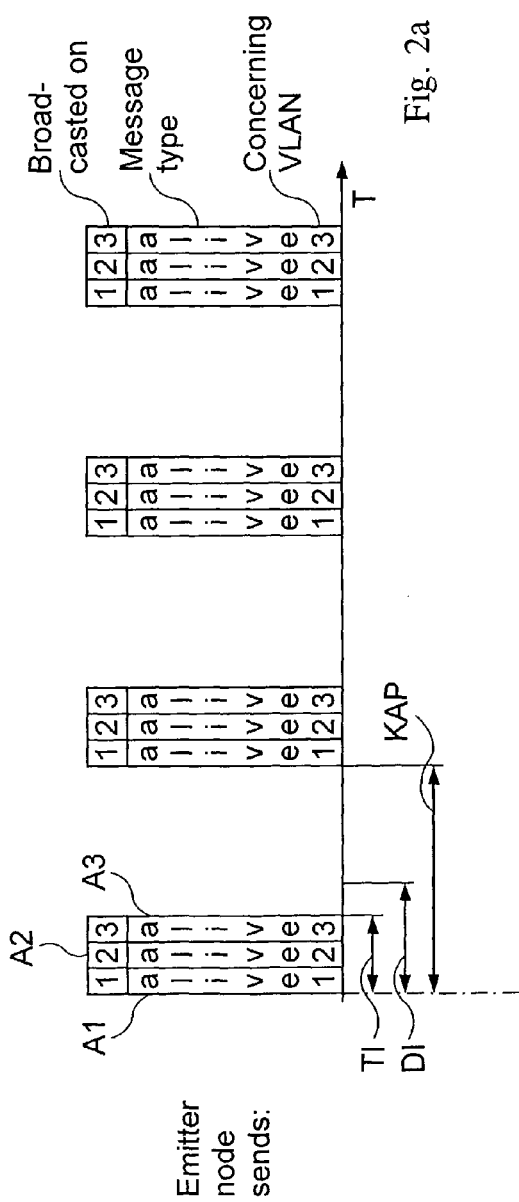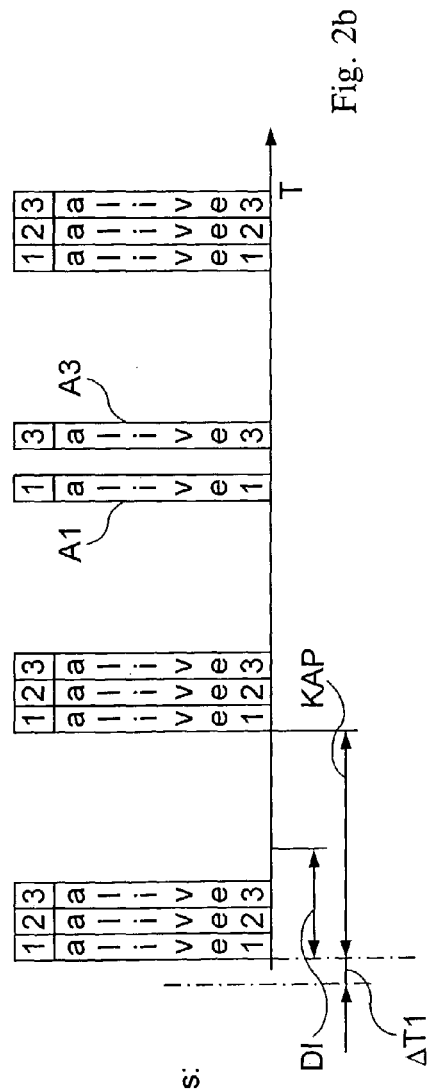

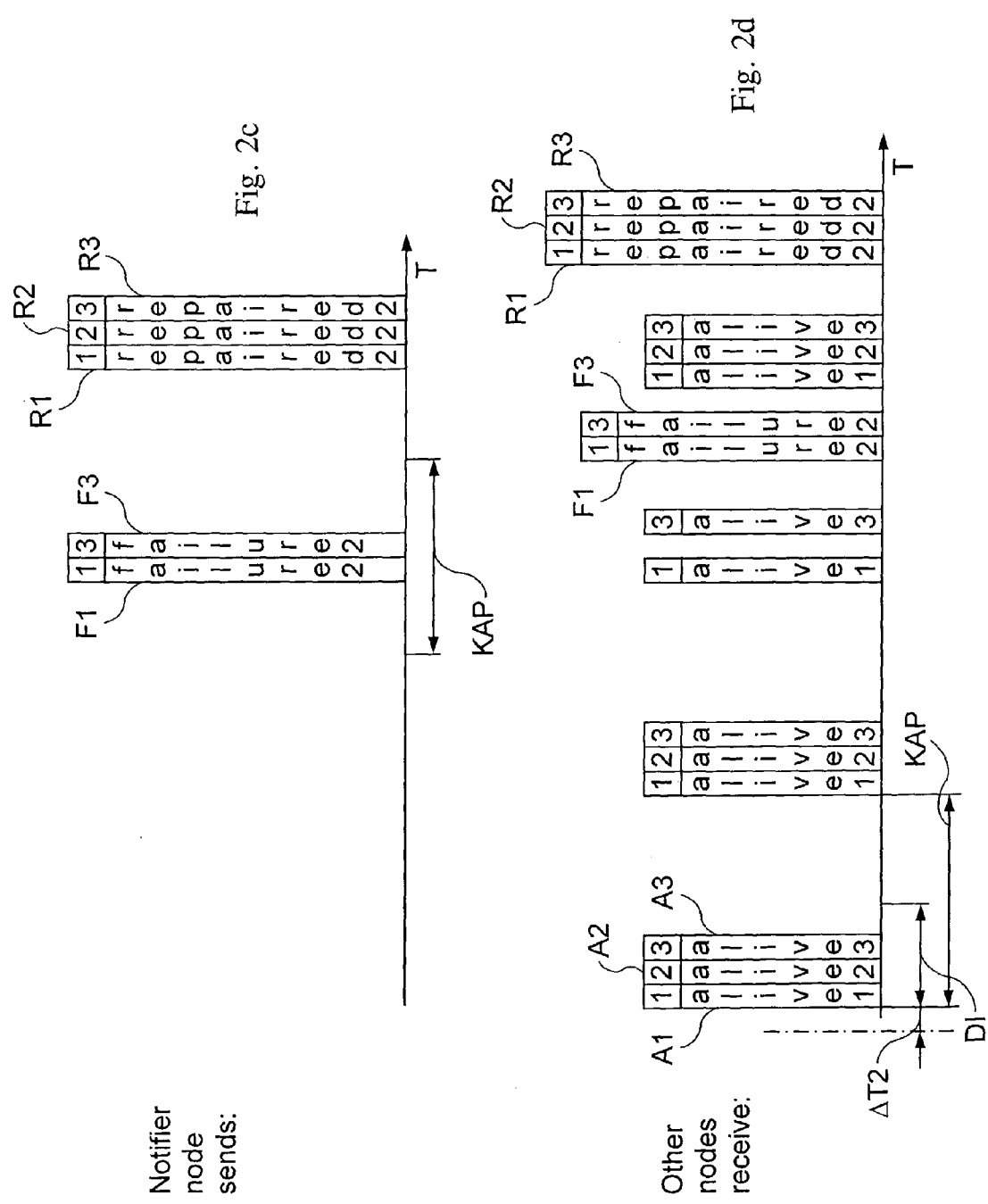

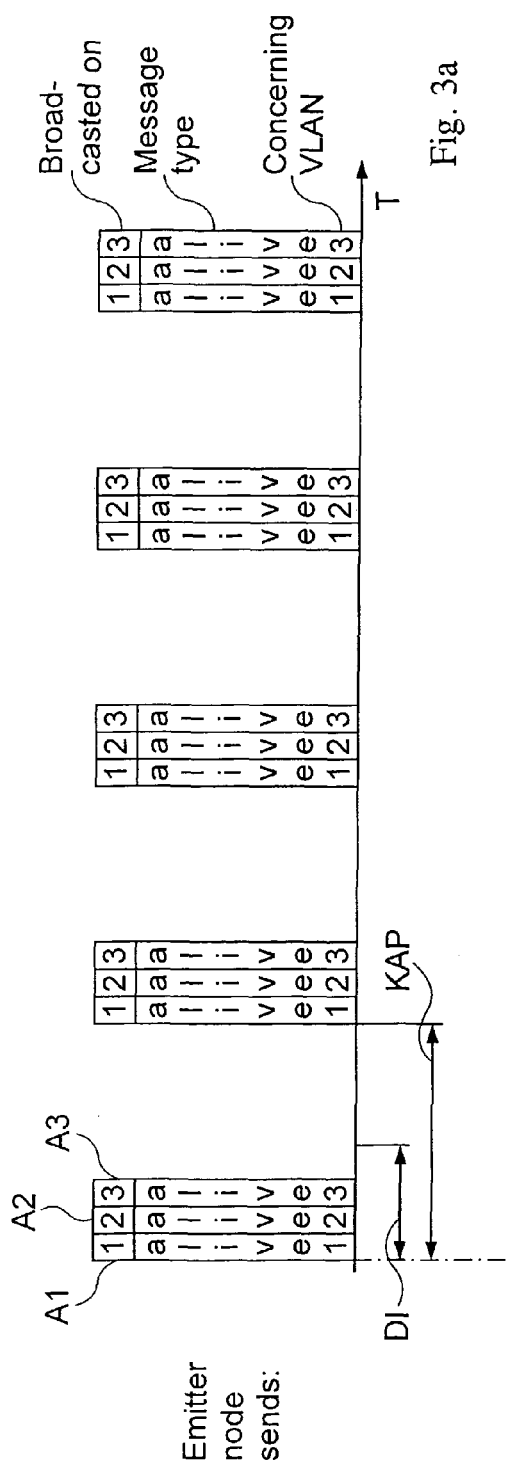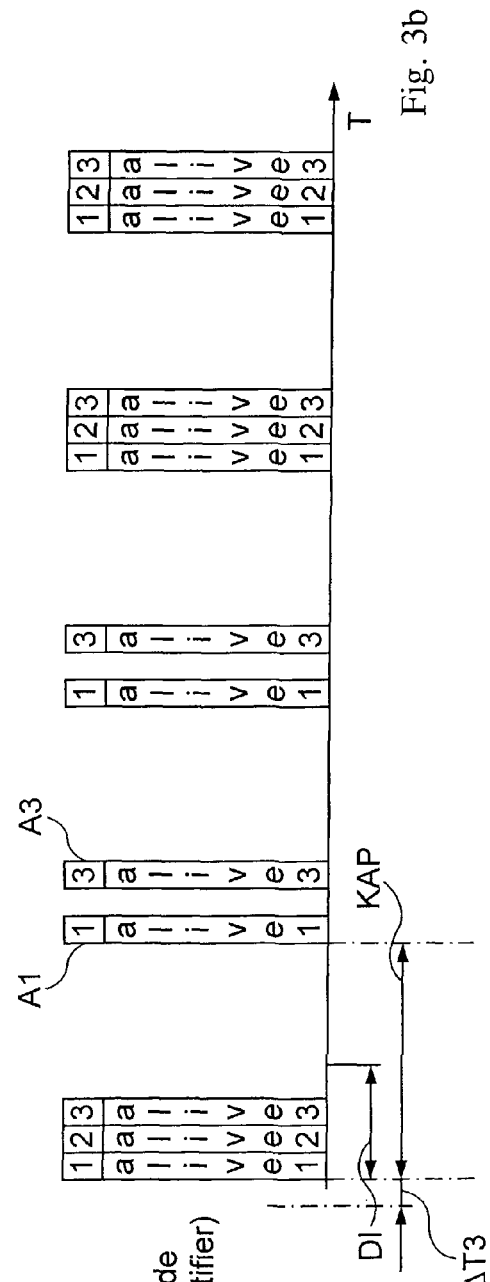

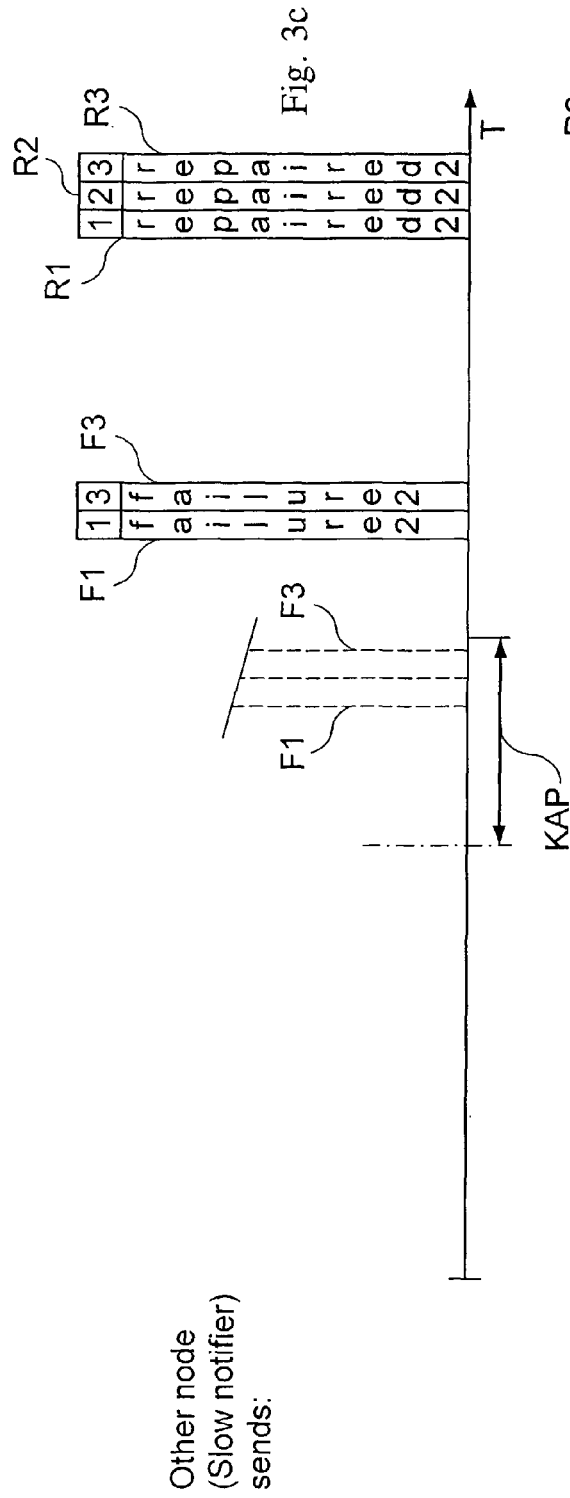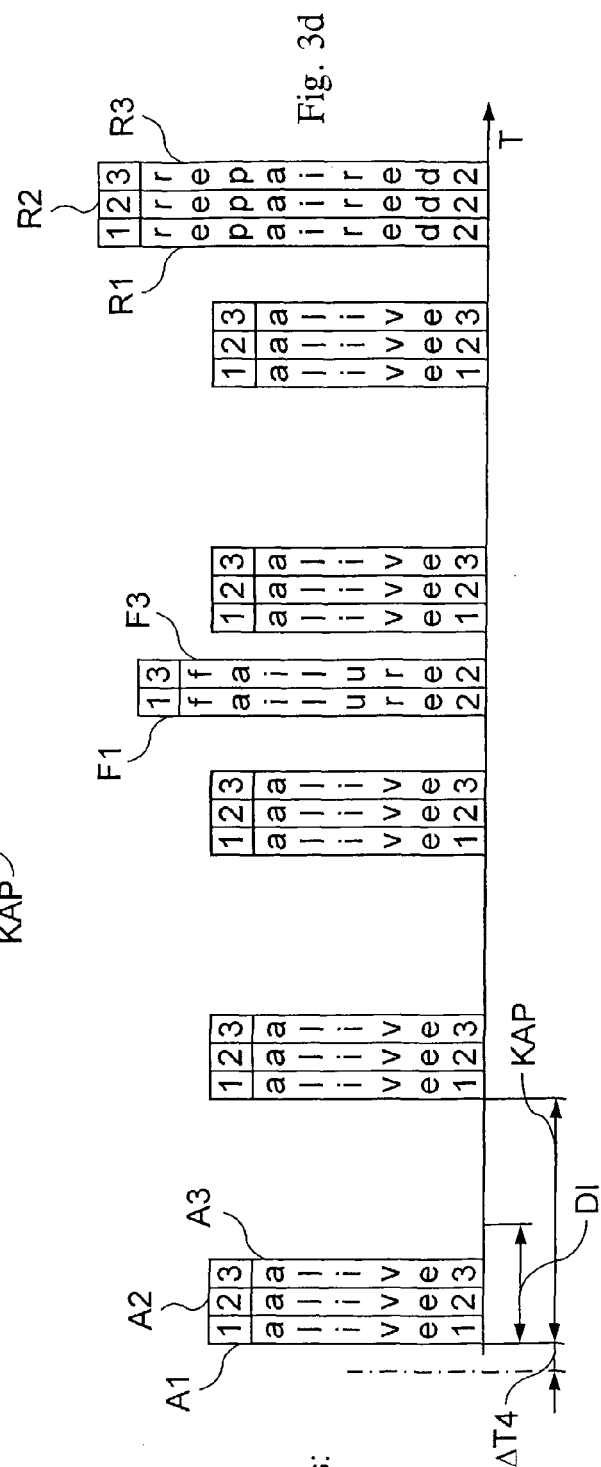

METHOD AND ARRANGEMENT FOR FAILURE HANDLING IN A NETWORK

TECHNICAL FIELD OF THE INVENTION

The present invention relates to failure handling in a tree structure network.

DESCRIPTION OF RELATED ART

Networks, such as Ethernet networks, for exchanging information include nodes interconnected by links. A connection that is set up between a pair of end nodes in the network can suddenly fail. Methods have been developed to first detect the failing connection and then restore it.

"Spanning Tree Protocol" (STP) was the first resiliency method for Ethernet, which was mainly developed for avoiding loops to avoid circulation of broadcast messages. STP also provides path redundancy by the activation of unused links. In case of link failure, a former backup link is activated in order to reach the separated network segment. The construction of the spanning tree begins with the election of the root bridge among the bridges. The rest of the bridges calculate the shortest distance to the root bridge. The port providing this shortest path to the root bridge is the root port. The bridges exchange spanning tree control information in Bridge Protocol Data Unit (BPDU) messages. The main drawback of STP is its slow convergence. The failover time is in the order of ten seconds, typically from 30 to 60 seconds, and depends on the number of network devices. A further drawback of STP is that it is hardly controllable. That is, the first tree can be configured but the tree formed after a failure is not predictable.

"Rapid Spanning Tree Protocol" (RSTP) was the next step in the evolution of Ethernet resiliency protocols. It keeps the terminology and most of the parameters same as in STP. The most important difference to STP is that the number of possible operational states of ports is reduced from five to three states. Furthermore, message handling in a port does not depend on the role it plays in the spanning tree. BPDUs remained in the same format, just a few changes were introduced, i.e. all bits of the flag byte are used. One of the drawbacks of STP is that non-root bridges only generate BPDUs when a BPDU arrives on their root port. As opposed to this, in RSTP every bridge generates so-called hello BPDUs in a predefined time interval, e.g. in every 2 seconds. Furthermore, a faster aging is applied for protocol information, i.e. it is immediately aged out if hellos are not received in three consecutive hello periods. Thus BPDUs are used as a keep-alive mechanism between bridges, which makes the recovery faster. The convergence time of RSTP is reduced to the order of seconds so it is still not applicable in carrier grade networks.

EtheReal is a protocol that also aims to provide fast spanning tree reconfiguration and fault detection. The failure detection mechanism of EtheReal uses periodic hello messages between neighbours to indicate that the source of the message is alive. If consecutive hello messages fail to arrive then it is assumed that the connection has broken down and the construction of a new spanning tree begins. In EtheReal, all the connections going through the failed link are terminated and are re-established after a new spanning tree is rebuilt. The main drawback of EtheReal is that standard Ethernet switches do not support it while all network nodes have to be EtheReal aware for proper operation. Furthermore, it cannot be as fast as an architecture using precalculated spanning trees.

Failure detection could also be based on the recently developed "Bidirectional Forwarding Detection" (BFD) protocol. BFD was first developed for checking connectivity between neighbours and it was later extended to a protocol "BFD for multihop paths". However, BFD has not been developed for Ethernet yet. Furthermore, a point-to-point BFD would need to be run between each edge nodes of the network to detect all possible link failures, which may load the network too excessively.

With the spreading use of Virtual LANs (VLAN) it become obvious that the existing standard was not adequate as the same STP instance does not suit for all VLANs. Therefore, "Multiple Spanning Tree Protocol" (MSTP) was developed by IEEE. MSTP merges the best features of RSTP and VLAN.

The main improvement introduced by MSTP is that several VLANs can be assigned to a single spanning tree instance. These instances are independent of each other if there are more than one. The maximum number of spanning tree instances depends on the Ethernet switches; it can even reach a thousand instances. Thus, MSTP reduces the number of spanning tree instances required to support a large number of VLANs. Furthermore, load balancing is also possible with MSTP by providing multiple paths. In addition to this, the division of an Ethernet network into regions is also possible, which makes large networks more tractable by reducing the size of the spanning trees. Thus MSTP scales better than its ancestors but its convergence is not better than that of RSTP.

The properties of MSTP raise the idea of a fault tolerant approach that is based on MSTP. This idea is also applied in Viking system, where, spanning trees are constructed such that there are at least two switching paths for any end-node pair in two different spanning trees, which do not share intermediate links or nodes. Each spanning tree instance corresponds to a particular VLAN, thus explicit selection of a VLAN results in implicit selection of a spanning tree. In case of failures end-nodes have to change the VLAN in order to select an alternate path. The failure detection is based on the support provided by network switches. Each switch in the network is configured to send SNMP traps to the Central Manager in case of failures. Even though this method relies on standard Ethernet switches, it requires a fault management centre, which is not cost efficient and which slows down the failover procedure. The Central Manager is a central server, which is responsible for the overall operation of the network including fault handling. After failure notification, the central server finds out which VLANs are affected and informs the end-nodes about the necessary reconfiguration in order to use the backup VLAN. Each of the end-nodes has to run a client module, which is responsible for VLAN selection during operation. Clients also invoke load measurements of which results are sent periodically to the Central Manager. Thus, there is a centrally co-ordinated traffic management using the constructed spanning trees. The failover time provided by this system is slightly below a second.

SUMMARY OF THE INVENTION

A main problem with the above-mentioned technology of today in network failure handling is that today's methods are too slow. These methods have a failure detection time in the order of a second and more, which is unacceptable for real time applications.

Another problem is that many of the above-mentioned today's methods will cause a heavy traffic load in the networks.

Still a problem is that some of the today's methods are not standard compliant with e.g. Ethernet switches.

A further problem is that some methods are not robust enough, e.g. systems whose fault handling is centrally managed.

Still another problem is that some fault detection systems are applicable only on point-to-point connections and not on the breakdown of a spanning tree.

In brief the problems are solved in the following manner. In a network with a number of nodes there are configured virtual local area networks, VLANs, each VLAN connecting predetermined ones of the nodes. Broadcast alive messages are sent at regular intervals to check whether the VLANs are alive. The nodes register whether the alive messages arrive, and when an expected message is missing a broadcast notification is sent to other ones of the nodes. After this notification these nodes will know which of the VLANs that are unusable at the moment.

Somewhat more in detail the problems are solved in the following manner. Multiple of the VLANs are used and the topologies of the VLANs are configured such that at least one of the VLANs remains, which VLAN provides connectivity in case of any single failure in the network. A number of the network nodes are edge nodes and some of the edge nodes are dedicated to broadcast the alive messages regularly on the VLANs. The edge nodes listen to these messages on the different VLANs. If one of the listening nodes will miss an expected one of the alive messages on one of the VLANs, the node indicates that the actual VLAN is unusable at the moment by broadcasting a notification message to the other edge nodes on the VLANs.

A purpose with the present invention is to provide fast failure handling in a network.

Another purpose is that the handling will only slightly increase the traffic load in the network.

A further purpose is that the handling can be made compliant with present standards.

Still another purpose is that the handling will be robust and simple in operation.

A purpose is also that the handling will be applicable on networks with spanning trees.

A main advantage with the inventive failure handling is that it is fast.

Another advantage is that the inventive failure handling is simple and will only slightly increase the traffic load in the network.

A further advantage is that the inventive failure handling can be made compliant with present standards and standard internal nodes.

Still an advantage is that the inventive failure handling is distributed in the network, which contributes to that it will be robust and reliable.

Still another advantage is that the inventive failure handling is applicable on spanning trees in networks.

Advantages are also that the inventive failure handling will use only a few messages which are of only a few different types.

The invention will now be described more in detail with the aid of embodiments and with reference to the following figures.

BRIEF DESCRIPTION OF THE DRAWINGS

FIGS. 2 a, b, c and d show time diagrams for failure handling in the network;

FIGS. 3 a, b, c and d show time diagrams for an alternative failure handling in the network;

DETAILED DESCRIPTION OF EMBODIMENTS

Figure 1A:
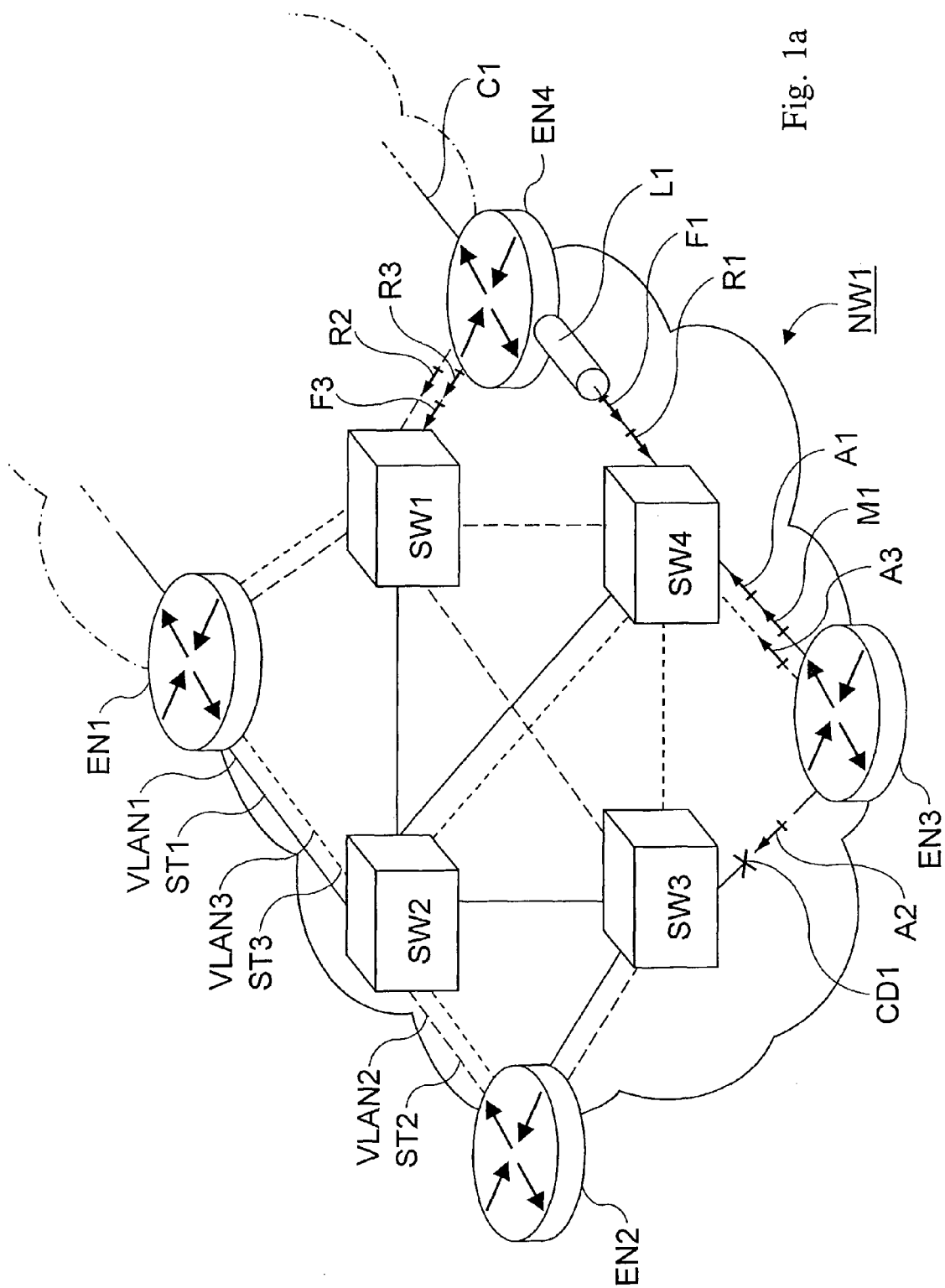
FIG. 1a shows an overview of a network with a set of failure handling messages.

In FIG. 1a is shown an example of a simple Ethernet network NW1 in connection with which the present failure handling will be described. In the network four switching nodes SW1, SW2, SW3 and SW4 are shown and also four edge nodes EN1, EN2, EN3 and EN4 are shown. The nodes are all interconnected by links, of which only one link L1 is shown to keep the figure simple. The network NW1 shown in FIG. 1a is just a simplified example network for illustration. Naturally, the present invention can be applied in wide networks having several internal nodes and edge nodes. The network NW1 has further nodes which are not shown in the figure and a further part of the network is only hinted by a dash-dotted contour line and a link C1. Three spanning trees are defined in the example network NW1, a first spanning tree ST1 shown in continuous lines between the nodes, a second spanning tree ST2 in dashed lines and a third spanning tree ST3 in dotted lines. To each of the spanning trees ST1, ST2, ST3 is assigned a virtual local area network VLAN1, VLAN2 and VLAN3 respectively. The network NW1 has the task to transport frames, exemplified by frames of a traffic message M1.

Figure 1B:
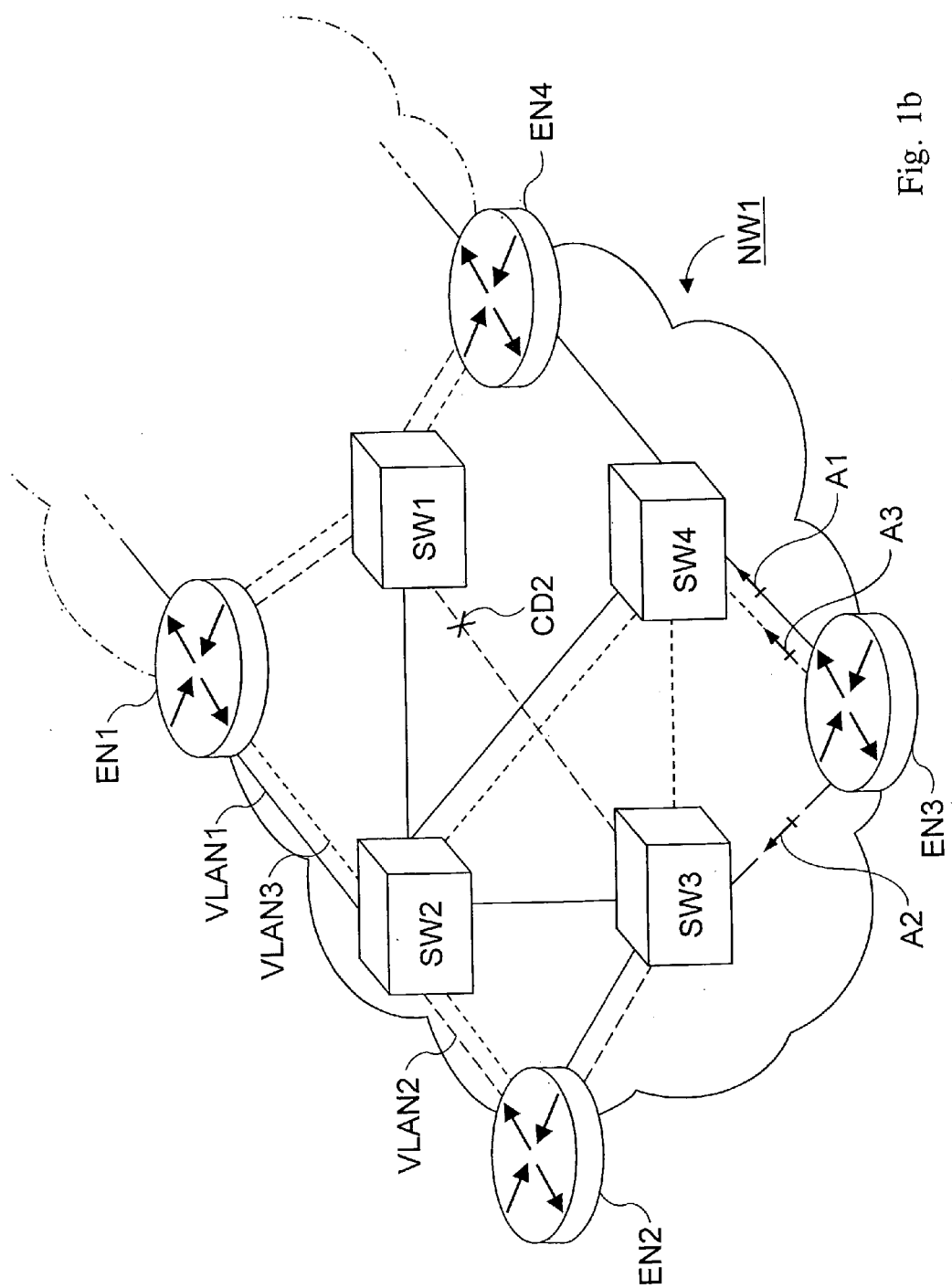
FIG. 1b shows the network with an alternative set of failure handling messages.

Also in FIG. 1b the network NW1 is shown. The FIGS. 1a and 1b differ in that they have failures in different places, as will be described in detail later.

In the network NW1, and similar networks, failures can araise that prevent the frames of the traffic message M1 to reach their destination. It can be any type of failure, e.g. a failing switch or a failing connection. For the functioning of the network it is essential that the failure can be detected so that affected nodes can be notified and stop their sending of messages. Also, when the failure is repaired the nodes shall be notified to start sending again.

As mentioned above several state-of-the-art methods are available for such failure handling. They all suffer from different drawbacks such as they are slow, they generate a heavy traffic load, are not standard compliant or they are not robust enough.

In connection with FIGS. 1a and 1b it will be described an embodiment of failure handling, that will overcome the above drawbacks. It is a distributed failure handling mechanism for Ethernet architectures or other packet switched networks that apply tree-based forwarding and it provides resiliency with the multiple spanning trees ST1, ST2 and ST3 calculated in advance. All the spanning trees connect each of the network nodes EN1 to EN4 and SW1 to SW4, they only differ in the contained links as appear from the figure. The architecture includes the standard Ethernet switches SW1 to SW4 that are available on the market. The extra functionalities that are needed for providing fault detection and resiliency are implemented in the edge nodes EN1 to EN4 of the Ethernet network NW1. In the present embodiment the edge nodes are IP routers. The multiple spanning trees ST1, ST2 and ST3 are applied for providing protection switching, and the trees are implemented with the help of VLANs or the protocol MSTP. The spanning trees are static and are configured in the network such that there remains at least one complete spanning tree in the case of a single failure in any of the network elements. One of the virtual LANs VLAN1, VLAN2 and VLAN3 is assigned to the respective one of the spanning trees, as mentioned. Traffic forwarding to the respective spanning tree can be controlled with the help of VLAN IDs in the edge nodes EN1 to EN4. That is, in the embodiment protection switching becomes VLAN switching in the network NW1. In the present description there is a one-to-one correspondence between the VLANs and the spanning trees. In the example network NW1 shown in FIGS. 1a and 1b all the three spanning trees ST1, ST2, ST3 are needed to make it possible to handle any single failure that can appear in the network.

In the case of a failure each of the edge nodes EN1 to EN4 need to stop forwarding frames, such as the frames of the traffic message M1, to the affected spanning trees. Therefore, a protocol is needed for failure detection and for informing all edge nodes about the identities of the VLAN:s which are affected by a specific failure. A failure handling method will be described in the following. First an embodiment of the failure handling will be described more broadly and then detailed examples will be given in connection with the network NW1 in FIGS. 1a, 1b, FIG. 2 and FIG. 3.

A new approach is proposed for the handling of faults in the networks. In the embodiment faults are handled with the aid of spanning trees in the networks, such as the spanning trees ST1 to ST3 in the network NW1. The networks are, more generally spoken, packet switched networks where tree topologies are used for traffic forwarding, e.g. Ethernet networks. In this new approach broadcast messages are utilized to check whether one of the spanning trees is alive or not, to decrease traffic and processing load as much as possible. Therefore, some of the edge nodes are configured to send a broadcast message in each VLAN regularly. All other nodes register the arrival of these messages and some nodes are dedicated to promptly send broadcast notification about unusable VLANs, if needed in all VLANs. After the broadcasted notification, each edge node will know which VLANs are unusable. The detailed operation of failure detection will be described in the following.

In the present embodiment three types of messages are used:
  alive: These messages are broadcasted periodically according to a predefined keep alive period KAP in each VLAN.
  failure: These messages are broadcasted in each unaffected VLAN when a failure is detected and contains the ID of the broken VLAN.
  repaired: These messages are broadcasted in at least the broken VLAN and possibly in each VLAN, for the notification of the failure reparation.

The edge nodes play one of the following roles:
  emitter: An edge node which periodically broadcasts the alive messages.
  notifier: An edge node which broadcasts the failure messages promptly when it detects failure and also broadcasts the repaired messages when it detects failure reparation.

In an alternative some of the edge nodes are the abovementioned fast notifier nodes, which promptly broadcast the failure messages. Another part of the edge nodes are also notifiers but are somewhat slower and broadcast the failure messages not promptly but within the same keep alive period KAP as it detects the failure.

no special role: An edge node which broadcasts the failure message if it detects failure in one keep alive period and then detects that the failure message is missing in the following keep alive period. It is neither an emitter node, nor an notifier node.

There are at least two emitter edge nodes in the network, which periodically broadcast alive messages in each VLAN according to the keep alive period. These messages are sent out within a short time, almost the same time, in one VLAN after the other. Thus, alive messages have to arrive within a short—topology dependent—interval called detection interval, to each edge node in all VLANs. Edge nodes have to observe the arrival of messages, for example they maintain a table where the arrival of alive messages is marked. A timer is started when the first message arrived. If the arrival of one or more alive messages is not marked in the table within the detection interval then the corresponding VLANs are considered as broken. Note that as many alive messages are expected in each of the VLANs as there are emitter nodes in the network. All edge nodes supervise the arriving of alive messages. There are a few notifier edge nodes, which broadcast a failure message after detecting a failure in each VLAN, which contains the ID of the broken VLAN or VLANs. Each edge node receives failure messages so all of them will be notified about the failure. The number of nodes that broadcast notification messages is limited in order to avoid too large traffic load after a failure. However, the network should be prepared for the case when notifiers cannot notify the others about the failure. Therefore, if an edge node, which is neither notifier nor emitter, detects a failure based on the missing arrival of an alive message and it does not receive the expected failure notification before the end of the next detection interval then this node broadcasts a failure message as well. The emitter nodes always broadcast the alive messages in all VLANs even if a failure is detected before. If the failure is repaired then the edge node that detected the failure will also detect the reparation because it receives again the formerly missing alive messages. Thus, the edge node can notify the others by broadcasting a repaired message to the others, which contains the ID of the repaired VLAN so traffic can be sent to it again. The edge node that sends repaired message can either be a notifier or other edge node that detected the failure. Another possibility to avoid high traffic load after failure is that the network has the emitter and fast notifiers as above but the other edge nodes are the slow notifier nodes. They broadcast the failure message faster than the nodes with no special role but not as promptly as the fast notifier nodes.

The above more broadly described embodiment of failure handling in a network will now be described in detail for the network NW1 in connection with the accompanying figures. In the example the node EN3 is one of the emitters, the node EN2 is one of the notifiers and the nodes EN1 and EN4 are of the other type having no special role.

FIG. 2 shows the situation when the notifier node EN2, notes a failure and sends a failure message. In the example the failure is that the connection between the nodes EN3 and SW3 is down for the spanning tree ST2. The failure is marked in FIG. 1a by an X and is referenced by CD1.

FIGS. 2 a, b, c, d are time diagrams with the time referenced by T. FIG. 2a shows that the emitter node EN3 transmits alive messages A1, A2 and A3 for the spanning trees ST1, ST2 and ST3 on the respective VLANs VLAN1, VLAN2 and VLAN3. These messages are also denoted in FIG. 1a. The alive messages are broadcasted within a very short period of time TI, almost the same moment, and are repeated periodically at the beginning of every keep alive period referenced KAP. In the uppermost part of the alive messages is denoted by the numbers 1, 2 and 3 on which of the VLANs the messages are broadcasted. In the middle the message type is denoted, in FIG. 2a an alive message, and at the lower part is denoted which of the VLANs the message concerns. It should be noted that the time interval TI is much shorter than the detection interval DI and much shorter than can be supposed from the FIG. 2a.

FIG. 2b shows that the notifier node EN2 receives the alive messages A1, A2, A3 in the detection intervals DI. The receiving is shifted a small amount of time AT1 due to a signal run time in the network. In the two first of the detection intervals DI all the alive messages are received but in the third detection interval only the alive messages A1 and A3 are received due to the failure CD1. The notifier node EN2 now notifies, via the VLAN VLAN2, that there is a failure in the spanning tree ST2.

FIG. 2c shows that the notifier node EN2 sends failure messages F1 and F3 immediately after the third detection interval. In the uppermost part of the messages is denoted the identity, 1 respective 3, for the VLANs on which the messages arrived. In the middle the type of message, failure, is denoted. At the lower part is denoted which of the VLAN:s the message concerns, in the example VLAN2. As appears from FIG. 2b that the failure is repaired immediately and the notifier node EN2 receives all the alive messages A1, A2, A3 in the fourth of the detection intervals DI. The notifier node EN2 therefore sends repair messages R1, R2 and R3 on the VLAN:s VLAN1, VLAN2 and VLAN3. In the example the repair messages are sent one keep alive period after the failure messages to inform that VLAN2 works again and the spanning tree ST2 is fully in duty. In an alternative the notifier node EN2 sends only the repair message R2 on the repaired VLAN VLAN2. This is not shown in the figure. The advantage with this embodiment is a lower traffic load caused by the failure handling.

FIG. 2d shows the messages which the other nodes EN1 and EN4 receive. In the first two detection intervals the nodes receive the alive messages A1, A2, A3. The receiving is shifted still a small amount of time AT2. In the third detection interval the nodes receive only the alive messages A1 and A3 and within the same keep alive period KAP they receive the failure messages F1 and F3. In the following keep alive period the nodes EN1 and EN4 receive all the alive messages A1, A2, A3 and also the repair messages R1, R2 and R3. In this way the other nodes are notified via the VLANs VLAN1, VLAN2 and VLAN3 when a failure has arised in one of the spanning trees SP1, SP2 or SP3 and when the failure is repaired so that all the spanning trees are fully in duty.

FIG. 3 shows the situation when it is one of the other nodes with no special role, node EN4 in the network NW1, that notes a failure and sends a failure message. In the example the failure is that the connection between the nodes SW1 and SW3 is down for the spanning tree ST2. The failure is marked in FIG. 1b by an X and is referenced by CD2. It is emphasized that it is the same network NW1 in both FIGS. 1a and 1b.

FIGS. 3 a, b, c, d are time diagrams with the time referenced by T as above. The diagrams for the different nodes are time shifted by periods AT3 and AT4 respectively. FIG. 3a shows that the emitter node EN3 transmits the alive messages A1, A2 and A3 for the spanning trees ST1, ST2 and ST3 on the respective VLANs VLAN1, VLAN2 and VLAN3. These alive messages are also denoted in FIG. 1b. The messages are broadcasted as described in FIG. 2a and also the content of the messages is denoted as in this figure.

FIG. 3b shows that the node EN4 receives all the alive messages A1, A2, A3 in the first of the detection intervals DI. In the second detection interval of the second keep alive period KAP only the alive messages A1 and A3 are received due to the failure CD2. No failure message is received in the second keep alive period KAP. In the third detection interval the message A2 is still missing and no failure message is received before the end of this third detection inteval. Observe that the failure CD2 does not prevent the notifier node EN2 to receive all the alive messages A1, A2 and A3, as can be understood from FIG. 1b.

FIG. 3c shows the actions of the node EN2. When it receives only the alive messages A1 and A3 in the second detection interval it waits for the failure messages F1 and F3 as described in connection with FIG. 2d. No failure message arrives, as described in FIG. 3b. The node EN4 therefore broadcasts the failure messages F1 and F3 in the third keep alive period KAP on the VLANs VLAN1 and VLAN3.

As appears from FIG. 3b the failure CD2 was repaired during the end of the third keep alive period KAP and the node EN4 receives all the alive messages A1, A2, A3 in the fourth detection interval. When it receives all the alive messages also in the fifth detection interval the node EN4 broadcasts the repair messages R1, R2, R3 in the fifth keep alive period, as shown in FIG. 3c.

FIG. 3d shows what happens in the notifier node EN2. In the first two detection intervals DI it receives all the alive messages A1, A2, A3. Also in the third detection interval DI it receives all the alive messages but in the third keep alive period KAP it also receives the failure messages F1 and F3. The node then stops to transmit message frames of e.g. the traffic message M1 to the VLAN VLAN2. In the fourth detection interval the node EN2 still receives all the alive messages just as in the fifth detection interval. In the fifth keep alive period the notifier node EN2 receives the repair messags R1, R2, R3 and can start again to transmit message frames of the traffic message M1 to the VLAN VLAN2.

When also the rest of the edge nodes of the network NW1 receive the failure messages F1, F3 they stop to transmit the message frames, such as the frames of the traffic message M1, on the failure reported VLAN, in the example VLAN2. When the repair message arrive the nodes start to transmit frames of the traffic message M1 again. It should be noted, however, that the emitter nodes always broadcast the alive messages A1, A2, A3 in all the VLANs even if they have received the failure message before.

A further embodiment is shown briefly in FIG. 3. In this embodiment the network NW1 has the node EN3 as one of the emitters and the node EN2 as one of the notifiers, as in the description above. The difference is that the nodes EN1 and EN4 now have the role of the abovementioned slow notifiers instead of being the node with no special role. The slow notifiers have a larger detection interval than the fast notifiers, at most as long as the keep alive period KAP. Thus failure detection can be done in one single keep alive period. The slow notifier EN4 receives all the alive messages A1, A2 and A3 in the first keep alive period but only the two alive messages A1 and A3 in the second keep alive period, as shown in FIG. 3b. In FIG. 3c is briefly shown in dashed lines that the slow notifier EN4 broadcasts the failure messages F1 and F3 in the second keep alive period. The failure messages are not sent promptly but at the end of the second keep alive period. This is slower than for the ordinary notifier node EN2 in FIG. 2c but faster than for the node with no special role. The repaired messages are sent from the slow notifier node when all the alive messages appear again, which is not shown in the figure. A network in which a minor part of the edge nodes are fast notifiers and the rest of the edge nodes, except the emitters, are slow notifiers has the advantage that the failure detection becomes rather fast for all failures and still the traffic load caused by the failure detection is acceptably low.

As noted above all the emitter nodes of the network transmit the alive messages for all the VLANs. All these alive messages are expected to reach the notifier nodes and the other nodes with no special role. In FIGS. 2 and 3 are however shown the alive messages broadcasted from only the emitter node EN3 and the influence on the different messages by the failures CD1 and CD2.

In connection with FIG. 2 and FIG. 3 the failures CD1 and CD2 are mentioned. It is also mentioned that the failures concern the connections and not the line itself. The described failure detection method naturally also detects failures on the line, but then the time for repair will be longer than what is shown in FIGS. 2 and 3.

The edge nodes have to observe and register the arrival of the failure detection messages. One implementation possibility for this purpose is maintaining tables to follow the arrival of the messages. These tables are the basis for the failure handling messages, i.e. it is decided based on these tables if a new message has to be broadcasted.

The emitter nodes do not need to maintain any table.

The notifier nodes maintain a table for the registration of the alive messages. Table 1 shows the alive message table in the notifier node EN2 if the failure CD1 happens.

TABLE 1

Registration table for alive messages

| Alive message | VLAN1 | VLAN2 | VLAN3 |
|---|---|---|---|
| The one before previous detection interval | Arrived | Arrived | Arrived |
| Previous detection interval | Arrived | Lost | Arrived |
| This detection interval | Arrived | Arrived | Arrived |

The edge nodes having no special role have to register the arrival of the alive messages and also the arrival of the failure messages.

Table 2 shows the table for failure messages maintained in the node EN4 when the failure CD1 happens. The node receives the failure messages F1 and F3 as shown in FIG. 2d.

TABLE 2

Registration table for failure messages

| Failure message | VLAN1 | VLAN2 | VLAN3 |
|---|---|---|---|
| The one before previous detection interval | | | |
| Previous detection interval | | Arrived | |
| This detection interval | | | |

However the Table 2 is empty in the node EN4 when the failure CD2 happens, which triggers the node EN4 to broadcast the failure message of FIG. 3c indicating the breakdown of the VLAN VLAN2.

In the FIGS. 7, 8 and 9 will be given examples on the implementation of the edge nodes.

Figure 7A:
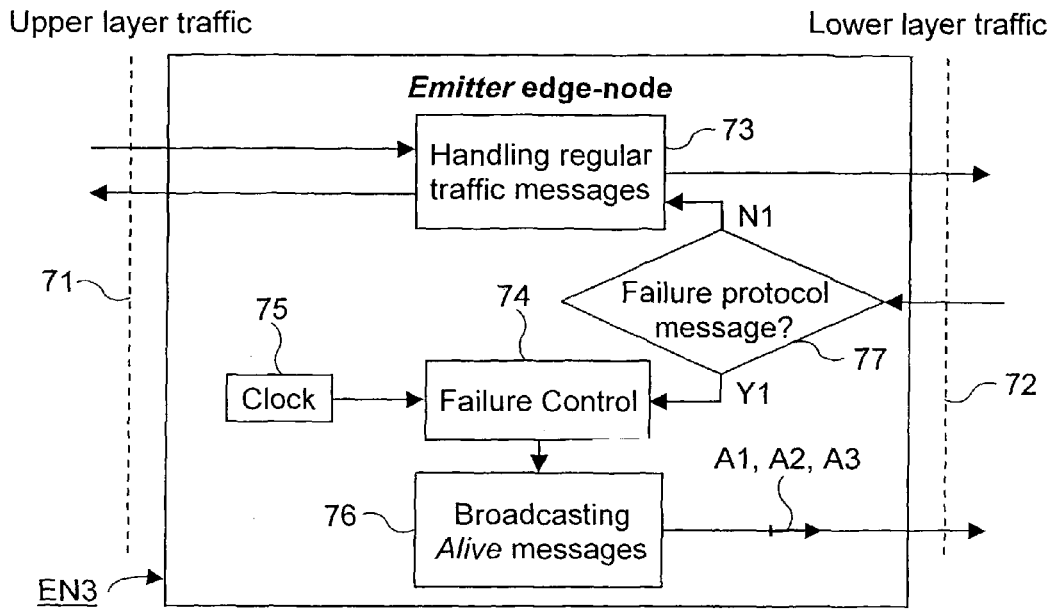
FIGS. 7 a and b show each a block diagram over an emitter node in the network.
Figure 7B:
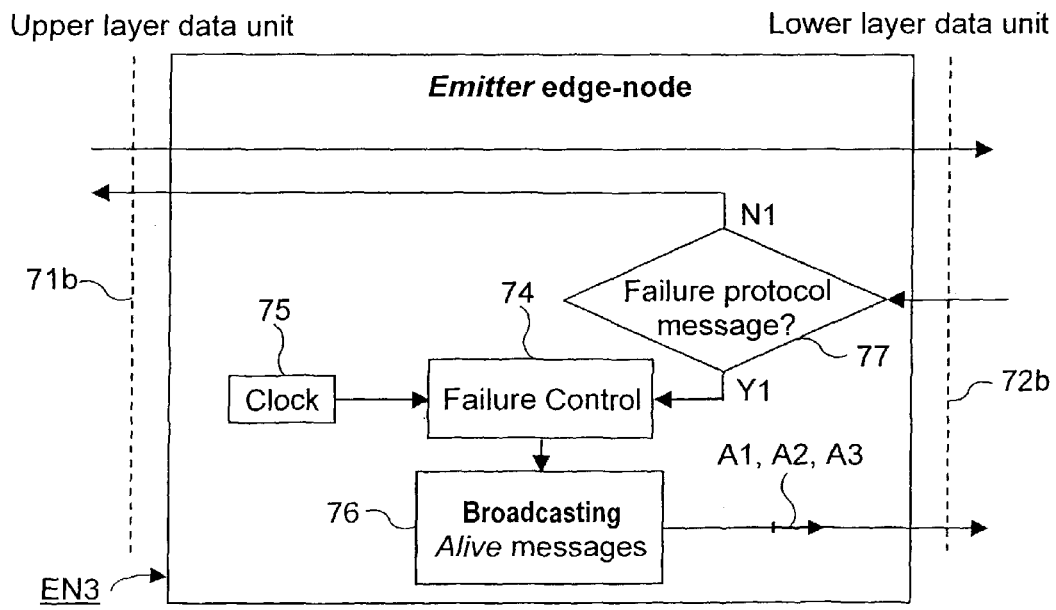

FIG. 7 shows block diagrams over the emitter node EN3. In FIG. 7a the node has an interface 71 for upper layer traffic and an interface 72 for lower layer traffic. A traffic message block 73 is connected to the network via the interfaces 71 and 72. A failure control block 74 is connected to a clock 75, a broadcasting block 76 and a message selecting block 77. The latter sends the traffic messages M1 to the traffic message block 73 in an alternative N1 and in an alternative Y1 it sends failure protocol messages such as F1 and R1 to the failure control block 74. The emitter edge node's main task is to broadcast the alive messages A1, A2 and A3 periodically from the broadcasting block 76. This is scheduled by the failure control block 74 based on the clock 75. As the message selecting block 77 sends the traffic messages to the block 73 the user traffic is not affected by the failure detection protocol. The failure control block 74 has another important task despite of its role in the failure detection protocol: It controls the VLAN switching, i.e. it manages the handling of failure and repairment. In FIG. 7b is shown an alternative which only describes the failure handling parts in the emitter node. The node lacks the traffic message block 73 and has interfaces 71b and 72b for upper and lower layer data units. The rest of the blocks are the same as in FIG. 7a.

Figure 8A:
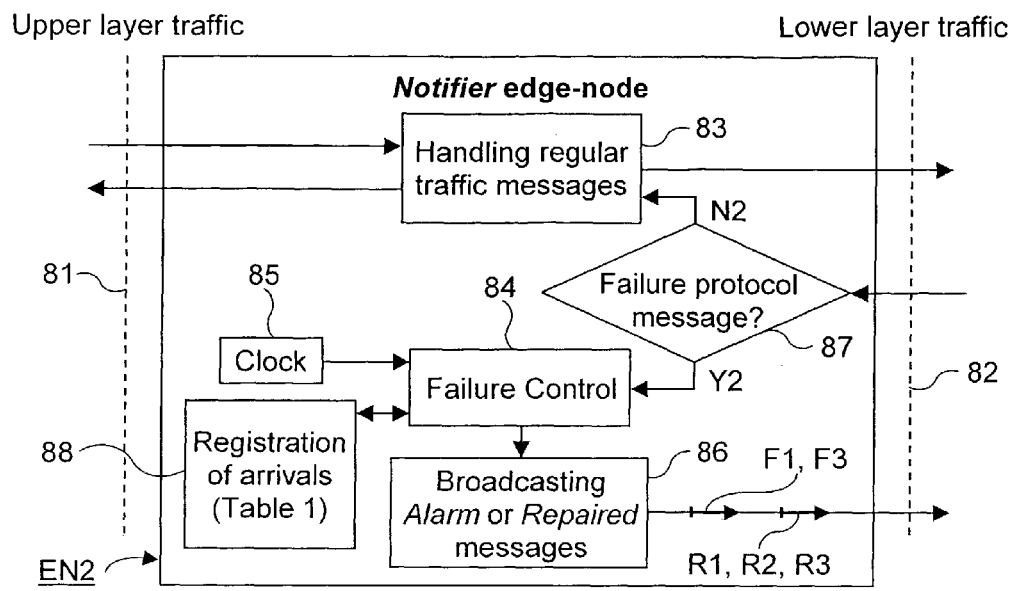
FIGS. 8 a and b show each a block diagram over a notifier node in the network.
Figure 8B:
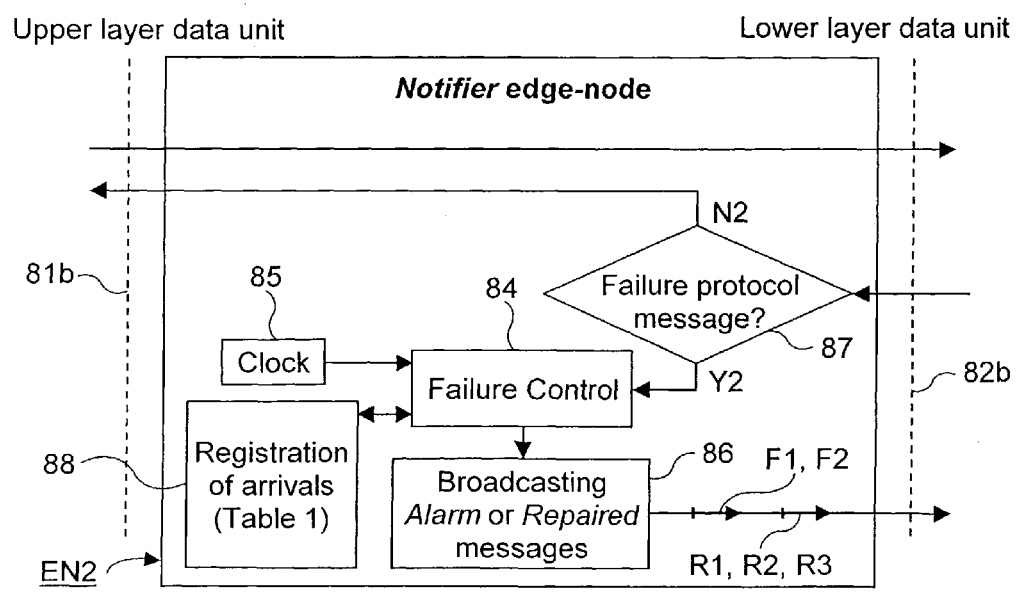

FIG. 8 shows block diagrams over the notifier node EN2. FIG. 8a shows that, in the same way as the emitter node, the node EN2 has an interface 81 for upper layer traffic and an interface 82 for lower layer traffic. A traffic message block 83 is connected to the network via the interfaces 81 and 82. A failure control block 84 is connected to a clock 85, a broadcasting block 86 and a message selecting block 87. The latter sends the traffic messages M1 to the traffic message block 83 in an alternative N2 and in an alternative Y2 it sends failure protocol messages such as F1 and R1 to the failure control block 84. The notifier node EN2 also has a registration block 88 which contains the abovedescribed Table 1. The notifier node leaves the regular traffic unchanged. The notifier node does not broadcast the alive messages A1, A2 and A3 but follows the arrival of these messages with the aid of the table 1, as described above. However the notifier node broadcasts from the broadcasting block 86 the failure messages F1, F3 or the repaired messages R1, R2, R3 if a failure appears or disappears, respectively. As with the emitter node EN3 the failure control block 84 in the notifier node EN2 controls the VLAN switching. In FIG. 8b is shown an alternative which only describes the failure handling parts in the notifier node. The node lacks the traffic message block 83 and has interfaces 81b and 82b for upper and lower layer data units. The rest of the blocks are the same as in FIG. 8a.

Figure 9A:
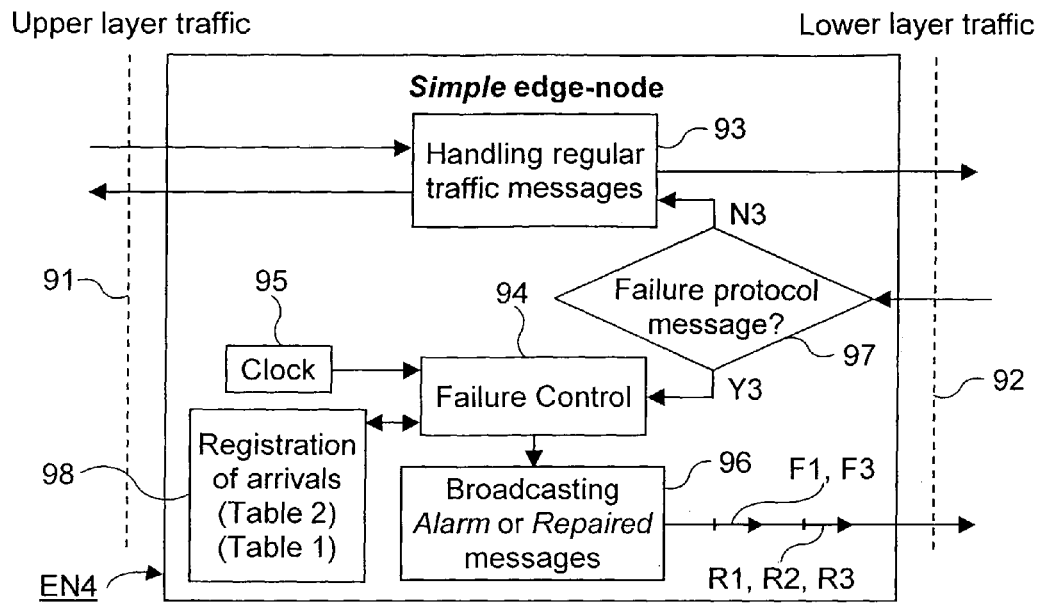
FIGS. 9 a and b show each a block diagram over a node with no special role in the network.
Figure 9B:
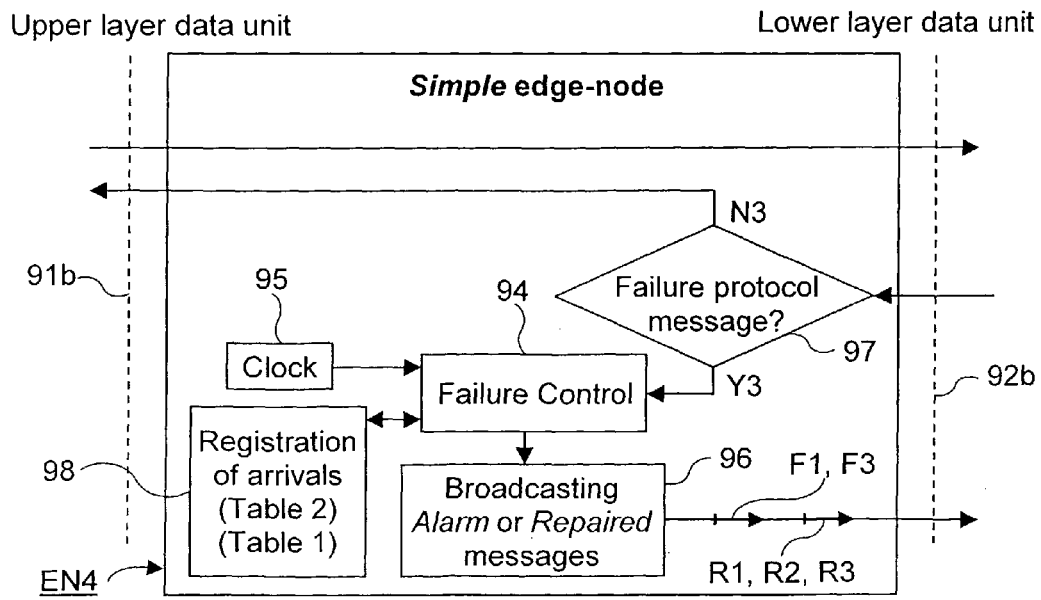

FIG. 9 shows block diagrams over the node EN4 having no special role. This node takes action when the notifier nodes do not fulfil their role in the failute handling. In FIG. 9a is shown that, in the same way as the notifier node, the node EN4 has an interface 91 for upper layer traffic and an interface 92 for lower layer traffic. A traffic message block 93 is connected to the network via the interfaces 91 and 92. A failure control block 94 is connected to a clock 95, a broadcasting block 96, a registration block 98 and a message selecting block 97. The latter sends the traffic messages M1 to the traffic message block 93 in an alternative N3 and in an alternative Y3 it sends failure protocol messages such as F1 and R1 to the failure control block 94. The node EN4 also has a registration block 98 which contains the two abovedescribed tables Table 1 and Table 2. The node EN4 leaves the regular traffic unchanged and does not broadcast the alive messages A1, A2 and A3. It follows the arrival of these messages with the aid of the tables Table 1 and Table 2, as described above. However, when the notifier nodes do not fulfil their role the node having no special role broadcasts from the broadcasting block 96 the failure messages F1, F3 or the repaired messages R1, R2, R3 if a failure appears or disappears, respectively. As with the emitter node EN3 the failure control block 94 in the node EN4 controls the VLAN switching. In FIG. 9b is shown an alternative which only describes the failure handling parts in the node having no special role. The node lacks the traffic message block 93 and has interfaces 91b and 92b for upper and lower layer data units. The rest of the blocks are the same as in FIG. 9a.

Figure 4:
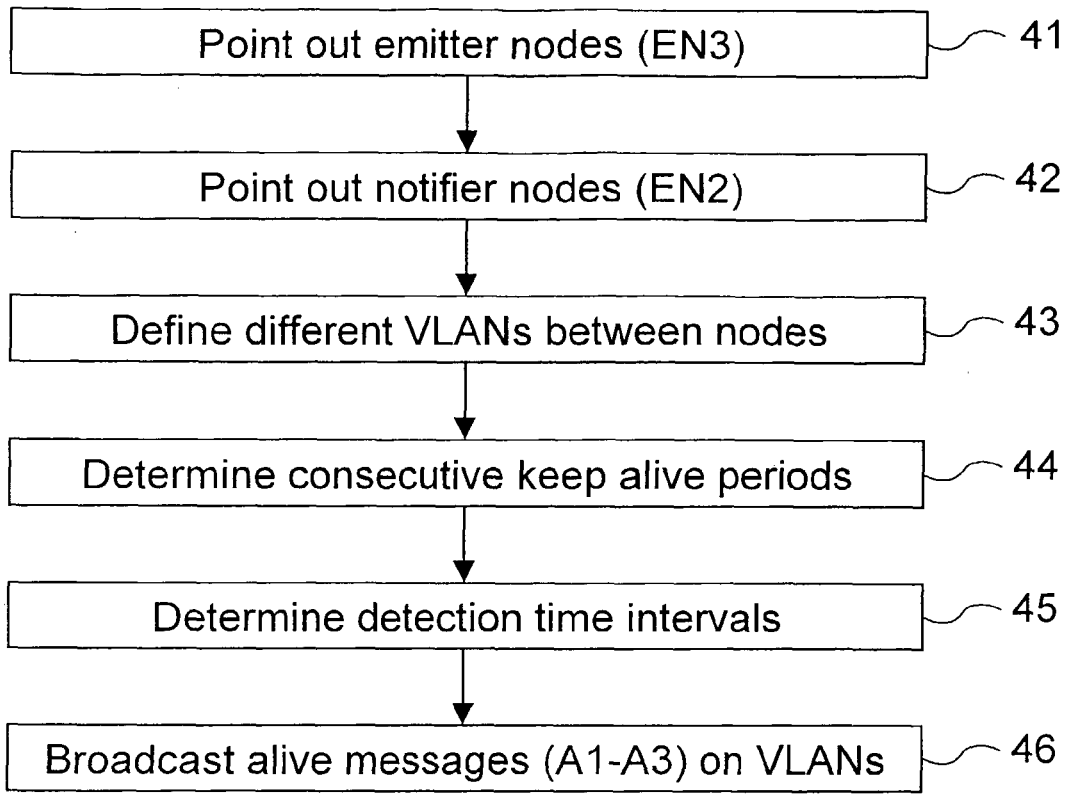
FIGS. 4, 5 and 6 show each a flow chart for failure handling in the network.

In FIG. 4 is shown a flow chart over a first part of the failure handling method described in connection with FIGS. 1, 2 and 3. The method starts with a step 41, in which the emitter nodes are pointed out, e.g. the node EN3 in the packet network NW1. In a step 42 the notifier nodes are pointed out. In a step 43 the VLANs, VLAN1 to VLAN3, between the nodes are defined, which can be made with the aid of the spanning trees and the protocol MSTP as described above. The consecutive keep alive periods KAP are determined in a step 44 and in a step 45 the detection intervals DI within the keep alive periods are determined. In a step 46 the alive messages A1, A2, A3 are repeatedly broadcasted on the VLANs from the emitter nodes, irrespective if any of the VLANs is reported as failing.

Figure 5:
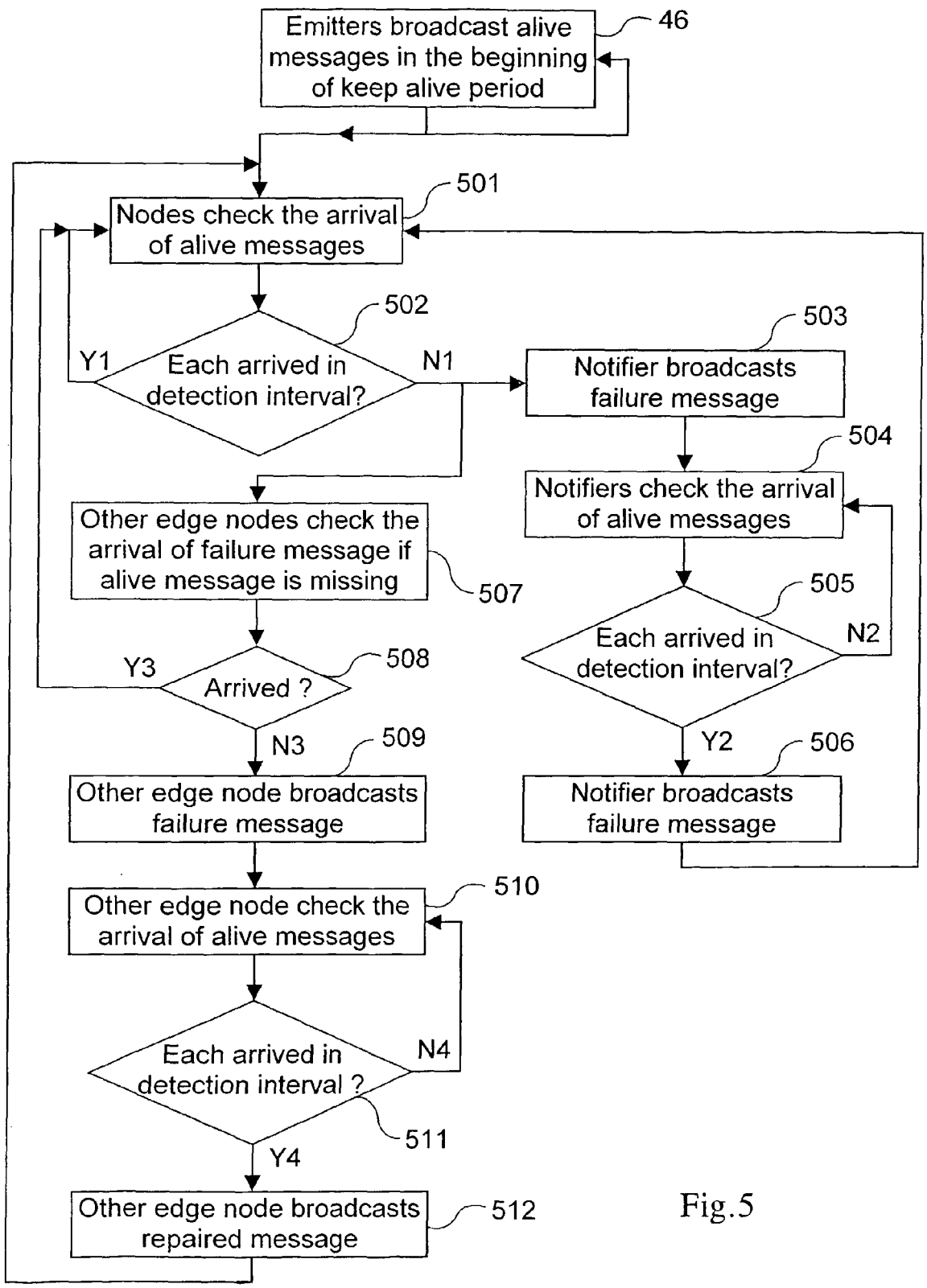

In FIG. 5 is shown a second and main part of the failure handling method. In the step 46 the alive messages are broadcasted repeatedly as mentioned. In a step 501 the edge nodes check the arrival of the alive messages A1, A2, A3. In a next step 502 the nodes check if all the alive messages arrive within one of the detection intervals DI. If so, in an alternative Y1, the nodes check the next set of the alive messages. If any of the alive messages fail to arrive, an alternative N1, two things can happen.

In a first case, if it is a notifier node that notes the failing alive message A2, it broadcasts the failure messages F1 and F3 in a step 503. In a step 504 the notifier node checks the arrival of the alive messages and in a step 505 the notifier node checks if all the alive messages arrive within one of the detection intervals DI. If not so, an alternative N2, the notifier node goes on checking the arrival of the alive messages in the step 504. In a step 505 the notifier node checks if all the alive messages arrive within one of the detection intervals DI. If not so, an alternative N2, the node once more checks the arrival of the alive messages in the step 504. If all the alive messages has arrived, an alternative Y2, the notifier node broadcasts the repaired messages R1, R2 and R3 in a step 506. The notifier node then returns to the step 501 and checks the arrival of the alive messages A1, A2, A3.

In a second case, if it is a node that is neither emitter nore notifier, it checks the arrival of the failure messages F1, F3 in a step 507. This check is performed in the keep alive period following the keep alive period in which the missing alive message was noted. In a step 508, an alternative Y3, the failure messages have arrived and the node returns to the step 501 and checks the arrival of the alive messages A1, A2, A3. In the step 508, an alternative N3, the failure messages have not arrived and the edge node broadcasts the failure messages F1, F3 in a step 509. In a step 510 the node checks the arrival of the alive messages and in a step 511 the node checks if all the alive messages arrived within one of the detection intervals DI. If not so, an alternative N4, the node returns to the step 510 checking the arrival of the alive messages. If all the alive messages has arrived, an alternative Y4, the node broadcasts the repaired messages R1, R2 and R3 in a step 512. The node then returns to step 501, checking the arrival of the alive messages.

Figure 6:
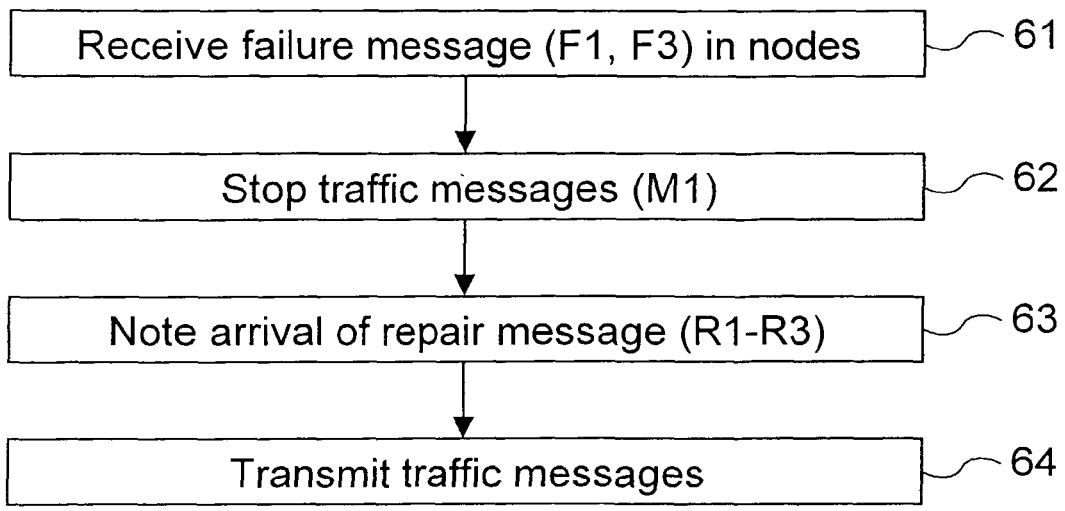

In FIG. 6 is shown a flow chart over a third part of the failure handling method. The nodes receive the failure messages in a step 61, which happens after either the step 503 or the step 509. In a step 62 the nodes stop transmitting the traffic messages on the failing VLAN VLAN2, exemplified by the message M1. The nodes on the VLANs receive the repair messages in a step 63 after either the step 506 or the step 512 and begin to transmit the traffic messages again in a step 64.

The above description of an embodiment of the invention involves a number of steps which are not absolutely necessary all of them. A broader embodiment of the invention involves the following steps. Pointing out emitter nodes in step 41, defining the VLAN:s without the aid of the spanning tree protocol in step 43, determining the detection time intervals in step 45, broadcasting the alive messages in step 46, listening for the alive messages in step 501, indicating failing alive message in a node in step 502, broadcasting failure message from the indicating node in step 503 or step 509.

There are reasons for involving also the other steps in the procedure. Pointing out some of the nodes as notifier nodes is not necessary but makes the failure handling simple and fast. Also the determined keep alive periods makes the handling fast. If the notifier nodes are used the failure handling will be more robust if also the other nodes can broadcast the failure messages in the situations when the notifier nodes will miss a failure. After having broadcasted the failure message the failure handling can advantageously be completed with the method steps 504 to 506 or the steps 510 to 512 so that the traffic messages M1 can first be stopped and then, after the failure repair, be transmitted again in the steps 62 to 64.

In FIGS. 1a and 1b is shown the network NW1 with four switch nodes and four edge nodes and a bigger network is hinted. In a real case the networks are often much bigger with hundreds of nodes and more. It is to be noted that not every one of these nodes must be involved in the VLAN:s. Some of the nodes may be of less importance and can be set aside to simplify the failure handling for the rest of the nodes. In the embodiment in FIGS. 1a to 3d the spanning trees ST1, ST2 and ST3 were configured and then the VLAN:s were assigned to the spanning trees. The spanning tree protocool MSTP offers a wellknown method but is not necessary for configuring the VLAN:s. For e.g. smaller networks the VLANs can be configured case by case, keeping in mind that for any single failure at least one of the VLANs must be intact, connecting all the nodes which are of interest in the network. The network above has tree structure and the method allows any such network without any restriction on the tree structure.

The invention claimed is:

1. An arrangement in a tree-structured packet network for handling failures, said network having a plurality of interconnected edge nodes and switching nodes, wherein at least two different virtual local area networks (VLANs) each connect a predefined set of the nodes, said arrangement comprising:
   a first portion of the edge nodes of the VLANs configured as emitter nodes, said emitter nodes including means for periodically broadcasting alive messages to all of the nodes on the different VLANs within a restricted time interval; and
   a second portion of the edge nodes of the VLANs configured as notifiers, said notifiers including:
      means for listening for the alive messages;
      means for determining that at least one of the alive messages failed to arrive within a periodically repeated detection time interval; and
      means for broadcasting on the VLANs, a failure message for the VLAN associated with the missing alive message;
   wherein the plurality of edge nodes include means for noting consecutive keep-alive time periods, wherein each keep-alive time period includes one of the detection time intervals;
   wherein the means within the emitter nodes for periodically broadcasting alive messages includes means for broadcasting the alive messages at the beginning of the keep-alive time periods; and wherein the means within the notifier nodes for broadcasting a failure message includes means for broadcasting the failure message within the same keep-alive time period in which it is determined that at least one of the alive messages failed to arrive within a periodically repeated detection time interval.

2. An arrangement in a tree-structured packet network for handling failures, said network having a plurality of interconnected edge nodes and switching nodes, wherein at least two different virtual local area networks (VLANs) each connect a predefined set of the nodes, said arrangement comprising:

a first portion of the edge nodes of the VLANs configured as emitter nodes, said emitter nodes including means for periodically broadcasting alive messages to all of the nodes on the different VLANs within a restricted time interval; and a second portion of the edge nodes of the VLANs configured as notifiers, said notifiers including:

means for listening for the alive messages;

means for determining that at least one of the alive messages failed to arrive within a periodically repeated detection time interval; and means for broadcasting on the VLANs, a failure message for the VLAN associated with the missing alive message;

wherein the means within the notifiers for determining that at least one of the alive messages failed to arrive within a periodically repeated detection time interval includes means for determining that at least one of the alive messages failed to arrive within first and second periodically repeated detection time intervals; and wherein the broadcasting means within the notifiers includes means for broadcasting on the VLANs, a failure message for the VLAN associated with the missing alive message within a predefined keep-alive time period after determining that the missing alive message failed to arrive within the second detection time interval.

* * * * *